United States Patent
Nakayama et al.

(10) Patent No.: US 11,819,786 B2
(45) Date of Patent: Nov. 21, 2023

(54) FILTER DEVICE, COLUMN, AND LIQUID CHROMATOGRAPHY DEVICE

(71) Applicant: ARKRAY, Inc., Kyoto (JP)

(72) Inventors: Yusuke Nakayama, Kyoto (JP); Takeshi Takagi, Kyoto (JP); Akira Kuga, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 214 days.

(21) Appl. No.: 17/123,799

(22) Filed: Dec. 16, 2020

(65) Prior Publication Data

US 2021/0178296 A1 Jun. 17, 2021

(30) Foreign Application Priority Data

Dec. 17, 2019 (JP) ................. 2019-227009

(51) Int. Cl.
*B01D 29/56* (2006.01)
(52) U.S. Cl.
CPC .......... *B01D 29/56* (2013.01); *B01D 2325/02* (2013.01)
(58) Field of Classification Search
CPC .... B01D 29/56; B01D 2325/02; B01D 36/02; B01D 36/00; G01N 30/603; G01N 30/60
See application file for complete search history.

(56) References Cited

U.S. PATENT DOCUMENTS

| | | | | |
|---|---|---|---|---|
| 4,551,249 A | * | 11/1985 | Shackelford | G01N 30/6021 210/198.2 |
| 5,667,676 A | * | 9/1997 | Alaska | B01D 15/206 210/656 |
| 9,216,366 B2 | | 12/2015 | Yotani | |
| 2012/0123091 A1 | * | 5/2012 | Blaschyk | G01N 30/6069 210/232 |
| 2014/0124444 A1 | * | 5/2014 | Anspach | G01N 30/603 210/656 |

FOREIGN PATENT DOCUMENTS

| | | |
|---|---|---|
| JP | S61-155012 U | 9/1986 |
| JP | H02-262054 A | 10/1990 |
| JP | 2007-127433 A | 5/2007 |

(Continued)

OTHER PUBLICATIONS

The extended European search report issued by the European Patent Office dated May 14, 2021, which corresponds to European Patent Application No. 20214728.6-1020 and is related to U.S. Appl. No. 17/123,799.

(Continued)

*Primary Examiner* — Waqaas Ali
(74) *Attorney, Agent, or Firm* — Studebaker & Brackett PC

(57) ABSTRACT

A filter device includes a first filter, a first retaining member that has a hollow shape, the first filter being fitted inside the first retaining member, a second filter that has a smaller pore size than the first filter, a second retaining member that is disposed downstream of the first filter and that has a hollow shape, the second filter being fitted inside the second retaining member, and a spacer that has a hollow shape, that is disposed between the first retaining member and the second retaining member, that maintains a non-contact state between the first filter and the second filter, and that includes a first contact portion contacting the first filter.

9 Claims, 12 Drawing Sheets

(56) References Cited

FOREIGN PATENT DOCUMENTS

| JP | 5521218 B2 | 6/2014 | |
|---|---|---|---|
| JP | 2016-128836 A | 7/2016 | |
| WO | 2008/014237 A2 | 1/2008 | |
| WO | WO-2008014237 A2 * | 1/2008 | ........... G01N 30/603 |

OTHER PUBLICATIONS

Communication pursuant to Article 94(3) EPC issued by the European Patent Office dated Jun. 15, 2023, which corresponds to European Patent Application No. 20214728.6-1001 and is related to U.S. Appl. No. 17/123,799.

An Office Action; "Notice of Reasons for Refusal," mailed by the Japanese Patent Office dated May 9, 2023, which corresponds to Japanese Patent Application No. 2019-227009 and is related to U.S. Appl. No. 17/123,799; with English language translation.

An Office Action mailed by China National Intellectual Property Administration dated Jul. 1, 2023, which corresponds to Chinese Patent Application No. 202011471590.8 and is related to U.S. Appl. No. 17/123,799.

* cited by examiner

_US 11,819,786 B2_

FILTER DEVICE, COLUMN, AND LIQUID CHROMATOGRAPHY DEVICE

CROSS-REFERENCE TO RELATED APPLICATION

This application is based on and claims priority under 35 USC 119 from Japanese Patent Application No. 2019-227009 filed on Dec. 17, 2019, the disclosure of which is incorporated by reference herein.

BACKGROUND

Technical Field

The present disclosure relates to a filter device, a column, and a liquid chromatography device.

Background Art

For example, Japanese Patent Application Laid-Open (JP-A) No. H02-262054 describes a high-speed liquid chromatography filter in which a coupling member is fitted over a column body so as to house a column filter in a space in the coupling member. The column filter is configured including an outer filter layer with a large pore size, and an inner filter layer with a small pore size.

Filter devices that include plural filters with different pore sizes to each other are employed in order to prevent filter clogging over a long period of time. However, even in cases in which plural filters with different pore sizes are employed, filter clogging may still occur in a short period of time, requiring filter replacement.

SUMMARY

An aspect of the present disclosure is a filter device that includes: a first filter; a first retaining member that has a hollow shape, the first filter being fitted inside the first retaining member; a second filter that has a smaller pore size than the first filter; a second retaining member that is disposed downstream of the first filter and that has a hollow shape, the second filter being fitted inside the second retaining member; a spacer that has a hollow shape, that is disposed between the first retaining member and the second retaining member, and that maintains a non-contact state between the first filter and the second filter, and that includes a first contact portion contacting the first filter.

DESCRIPTION OF EMBODIMENTS

First Exemplary Embodiment

Explanation follows regarding a filter device, a column, and a liquid chromatography device of a first exemplary embodiment, with reference to the drawings. In this explanation, as an example the liquid chromatography device provided with the filter device is employed to measure the concentration of glycated hemoglobin (HbA1c) in whole blood. However, the measurement subject is not limited thereto, and moreover the filter device may be applied to devices other than the liquid chromatography device.

Figure 1:
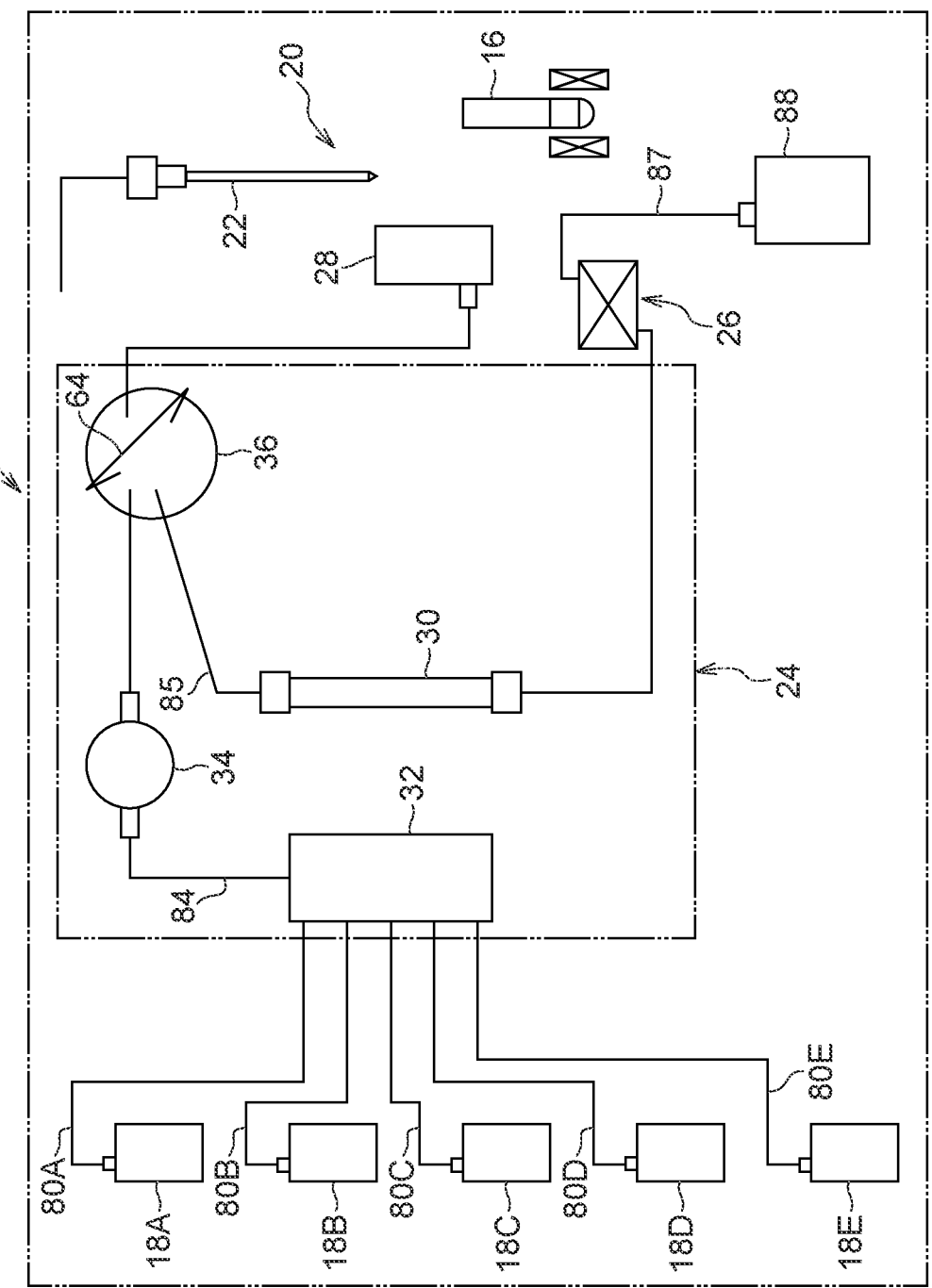
FIG. 1 is a configuration diagram illustrating a liquid chromatography device applied with a column provided with a filter device of a first exemplary embodiment.

As illustrated in FIG. 1, a blood collection tube 16 is set in a device body 14 of a liquid chromatography device 12. The liquid chromatography device 12 is capable of automatically measuring the concentration of glycated hemoglobin (HbA1c) in whole blood.

The device body 14 of the liquid chromatography device 12 includes plural (five in the example illustrated in FIG. 1) eluent bottles 18A, 18B, 18C, 18D, 18E. The eluent bottles 18A to 18E hold eluents A to E to be supplied to an analysis column 30, described later. Each of the eluents has a different composition, component ratio, acidity level, osmotic pressure, or the like, according to the purpose.

The device body 14 further includes a sample preparation unit 20, an analysis unit 24, and a light measuring unit 26.

The blood collection tube 16 is retained by the device body 14. The blood collection tube 16 is moved to a position from which a sample can be taken using a nozzle 22 of the sample preparation unit 20.

The sample preparation unit 20 includes the nozzle 22, and a dilution tank 28. The sample preparation unit 20 takes a sample of the blood in the blood collection tube 16 and introduces this blood to the dilution tank 28. The blood diluted in the dilution tank 28 is then introduced to the analysis column 30.

The nozzle 22 is capable of sucking in and expelling liquid, and may be applied to various liquids, in particular a blood sample from the blood collection tube 16. The nozzle 22 can use suction to take a sample of the liquid, and can then expel the liquid.

The analysis unit 24 includes the analysis column 30, a manifold 32, a liquid feeding pump 34, and an injection valve 36.

Figure 2:
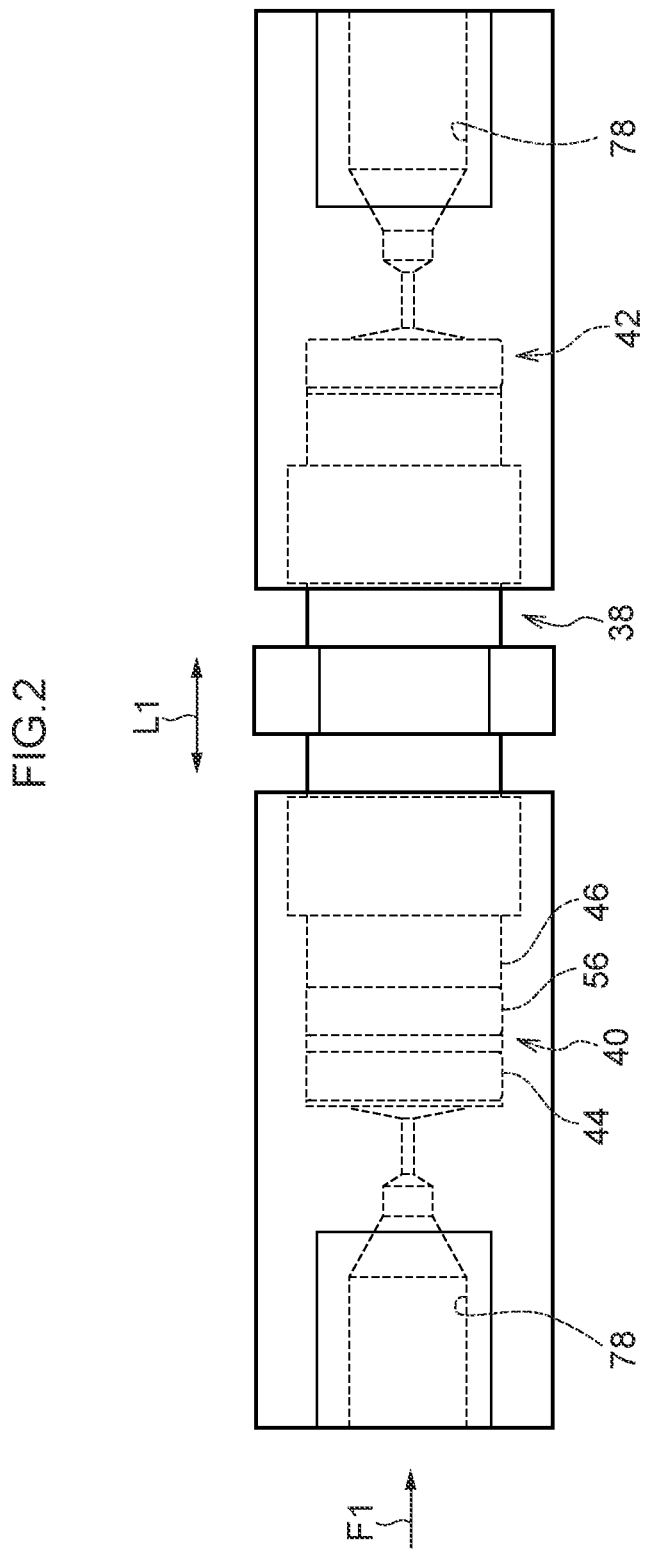
FIG. 2 is a side view illustrating a column provided with a filter device of the first exemplary embodiment.
Figure 3:
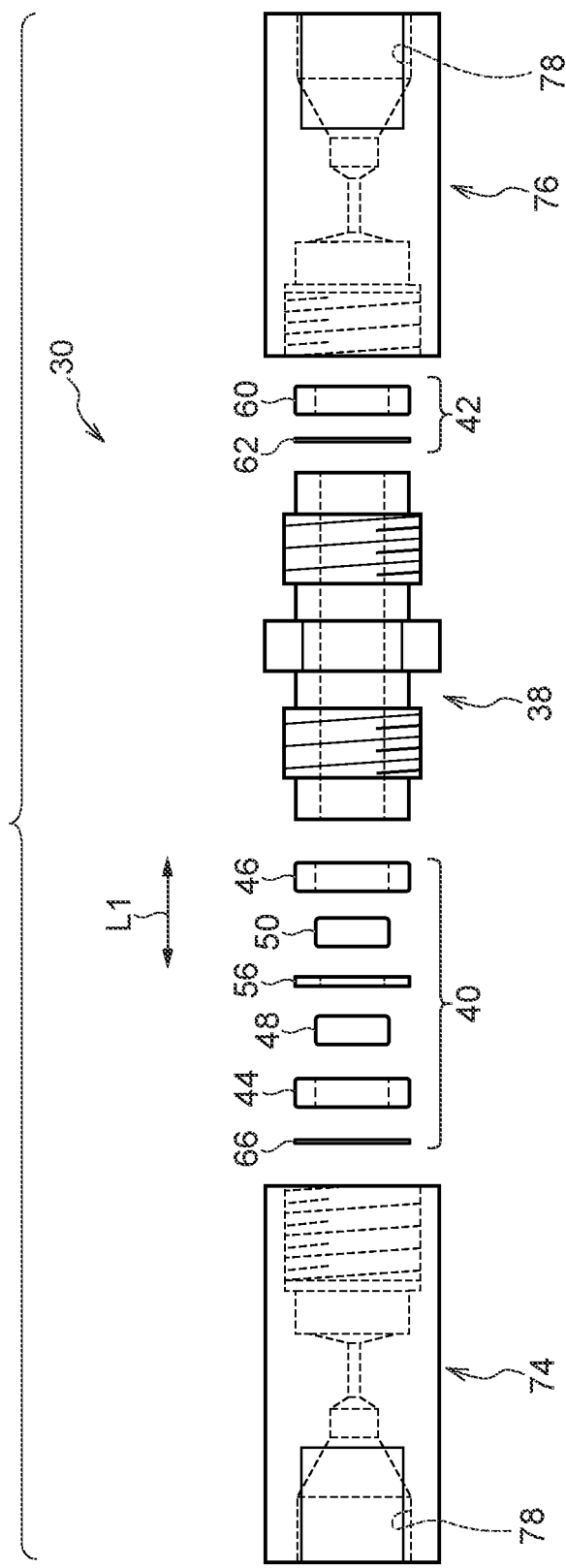
FIG. 3 is an exploded side view illustrating a column provided with a filter device of the first exemplary embodiment.

As illustrated in FIG. 2 and FIG. 3, the analysis column 30 includes a substantially circular cylinder shaped column body 38, and an upstream filter structure 40 and a downstream filter structure 42, respectively provided at the two axial direction (length direction, arrow L1 direction) ends of the column body 38. The upstream filter structure 40 is an example of a "filter device". A sample flows through the inside of the analysis column 30 in the arrow F1 direction. "Upstream" and "downstream" refer to upstream and whole blood downstream in this flow direction.

A filler is retained inside the column body 38 in order to cause selective adsorption of hemoglobin in the sample. For example, a methacrylic acid/methacrylic acid ester copolymer may be employed as the filler.

The analysis unit 24 controls adsorption and desorption of biogenic components by the filler in the analysis column 30, and supplies various biogenic components separated in the analysis column 30 to the light measuring unit 26. As an example, the analysis unit 24 is set to a temperature in the region of 40° C.

The manifold 32 is connected to the eluent bottles 18A, 18B, 18C, 18D, 18E via respective tubes 80A to 80E, and is connected to the injection valve 36 by a tube 84 with the liquid feeding pump 34 interposed between the manifold 32 and the injection valve 36. The manifold 32 switches internal valves so as to selectively supply eluent to the analysis column 30 from a specific eluent bottle out of the plural eluent bottles 18A to 18E.

The liquid feeding pump 34 is provided partway along the tube 84, and imparts a motive force in order to move the eluent to the injection valve 36.

The injection valve 36 includes plural entry ports and exit ports (not illustrated in the drawings), and is capable of taking an introduction sample of a fixed quantity, and of introducing such an introduction sample into the analysis column 30.

An injection loop 64 is connected to the injection valve 36. The injection loop 64 is capable of retaining a fixed quantity (for example several μL) of liquid. Switching the injection valve 36 as appropriate enables selection of either a state in which the injection loop 64 is in communication with the dilution tank 28 and the introduction sample is supplied from the dilution tank 28 to the injection loop 64, or a state in which the injection loop 64 is in communication with the analysis column 30 via a tube 85 and the introduction sample is introduced to the analysis column 30 from the injection loop 64. For example, a six-way valve may be employed as the injection valve 36.

The light measuring unit 26 is connected to a waste liquid tank 88 via, a tube 87, Liquid discharged from the analysis column 30 is discarded in the waste liquid tank 88. The light measuring unit 26 optically detects the hemoglobin contained in the eluent that has passed through the analysis column 30.

Figure 4:
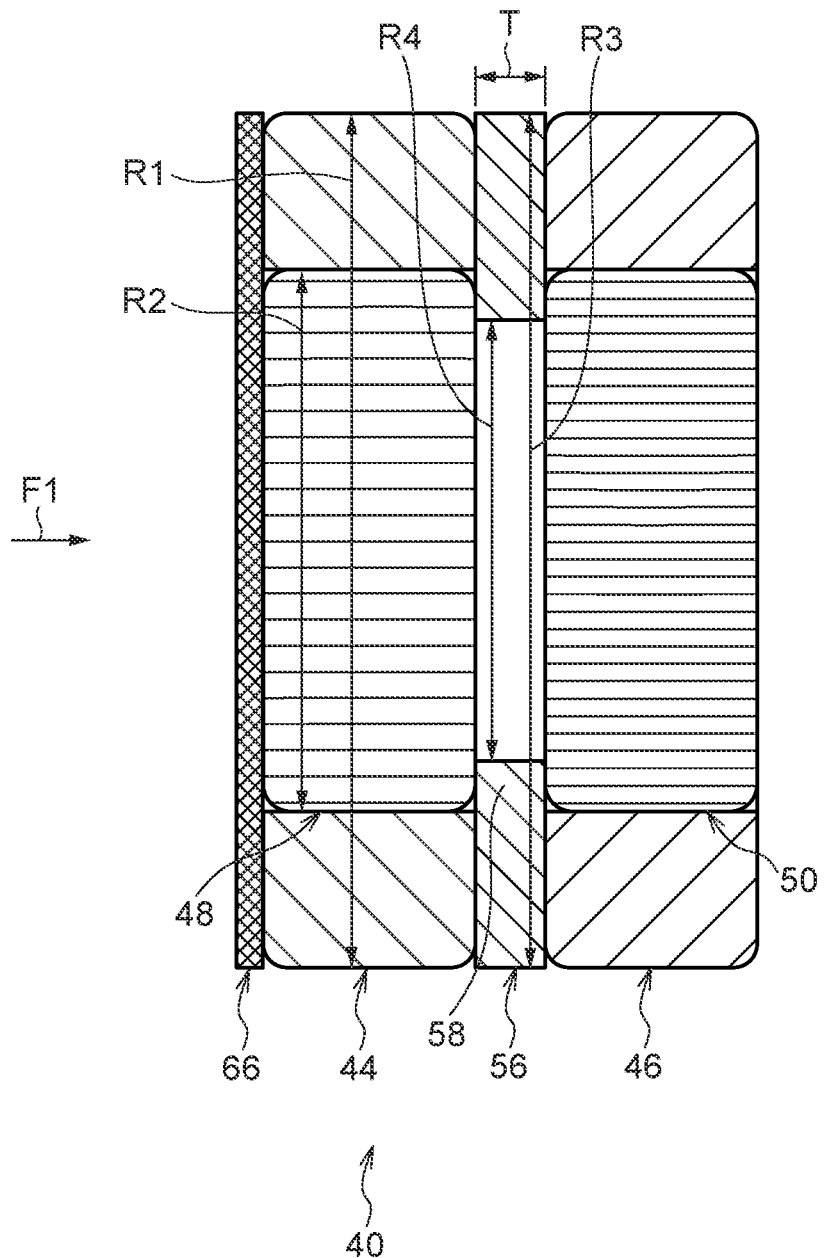
FIG. 4 is a cross-section illustrating an upstream filter structure serving as an example of a filter device of the first exemplary embodiment.

The upstream filter structure 40 of the analysis column 30 includes a first retaining member 44 and a second retaining member 46, as illustrated in FIG. 3 and FIG. 4. The first retaining member 44 is a hollow ring-shaped member, and a first filter 48 is retained in a hollow portion at the radial direction inside of the first retaining member 44. The second retaining member 46 is a hollow ring-shaped member that has substantially the same external diameter, internal diameter, and thickness (liquid feed direction length) as the first retaining member 44. A second filter 50 is retained in a hollow portion at the radial direction inside of the second retaining member 46. The first filter 48 is disposed upstream of the second filter 50, Namely, the first filter 48 is disposed closer to the inlet of the analysis column 30. As an example, the first filter 48 and the second filter 50 are configured by membrane filters or sintered filters configured to trap particles on their filter surfaces. Note that the first retaining member 44 and the second retaining member 46 do not necessarily have the same thickness as each other.

As described above, in the present exemplary embodiment, the first retaining member 44 and the second retaining member 46 have substantially the same external diameter R1, and substantially the same internal diameter R2 and thickness. The first retaining member 44 and the second retaining member 46 are housed snugly in internal spaces of caps 74, 76, described later. Moreover, in the present exemplary embodiment, the first retaining member 44 and the second retaining member 46 are both made from resin.

Figure 5:
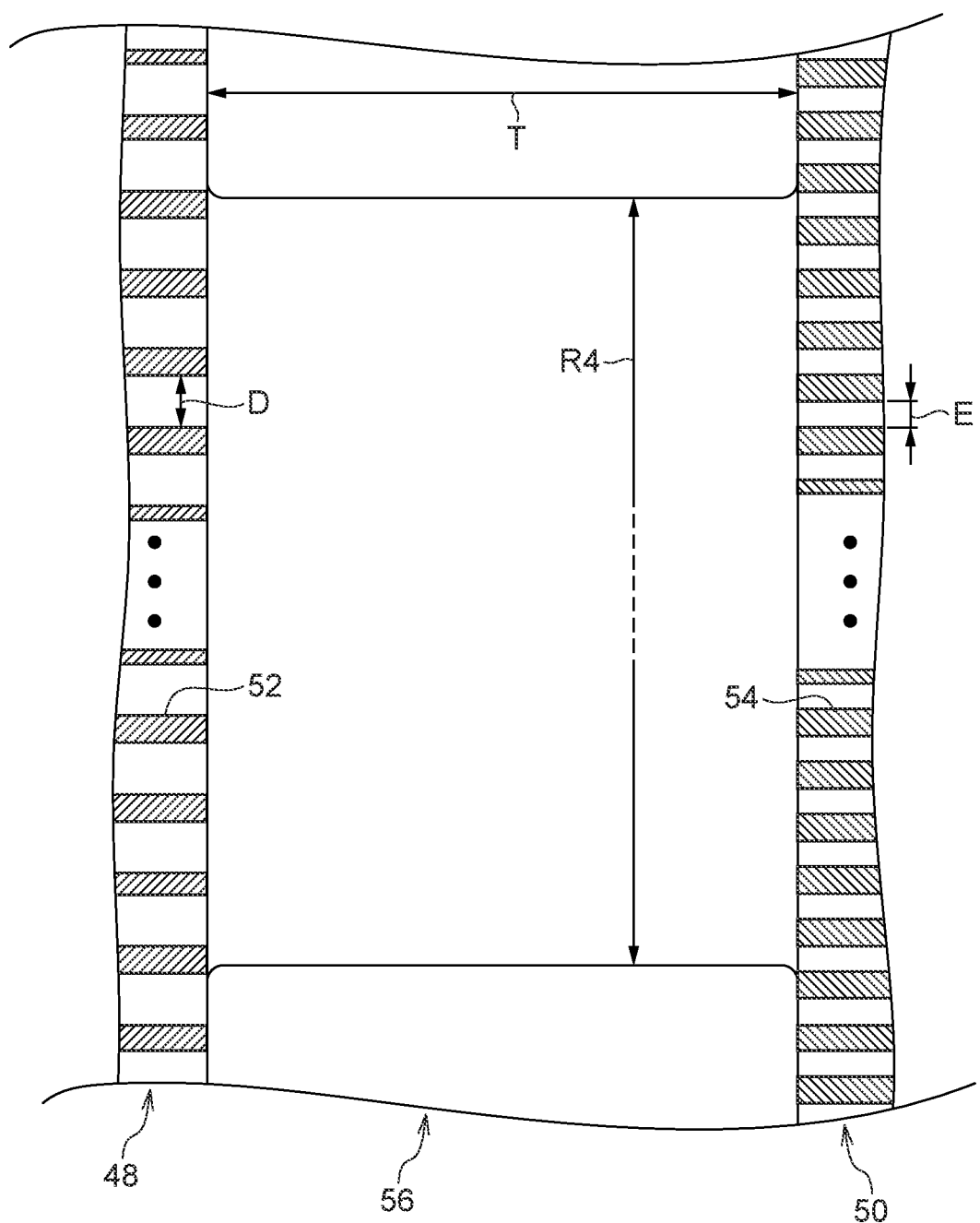
FIG. 5 is an enlarged diagram illustrating part of an upstream filter structure serving as an example of a filter device of the first exemplary embodiment.

As illustrated in FIG. 5, the first filter 48 is formed with numerous percolation holes 52, each having a specific pore size D. The second filter 50 is formed with numerous percolation holes 54, each having a pore size E that is smaller than that of the percolation holes 52 in the first filter 48. Note that although the pore size D and the pore size E are respectively illustrated as uniform diameters in FIG. 5, in reality variation within a specific range may be present in the pore size D and the pore size E of the first filter 48 and the second filter 50. However, the pore size E of the percolation holes 54 in the second filter 50 is smaller than the particle size of the filler in the column body 38. Liquid introduced to the analysis column 30 by the pump passes through the first filter 48, and then passes through the second filter 50. As will be described later, in the present exemplary embodiment, a filtration subject flows from the first filter 48 that has the larger pore size to the second filter 50 that has the smaller pore size. Namely, the second filter 50 that has the smaller pore size is a filter disposed downstream of the first filter 48 that has the larger pore size.

In the present exemplary embodiment, the first filter 48 is configured by a porous resin (sintered resin product), and more specifically, is made of polyethylene. The resin first filter 48 is thus fitted inside and retained by friction in the hollow portion at the radial direction inside of the first retaining member 44 that is also made of resin. The outer side of the first filter 48 is surrounded by the first retaining member 44. The thickness of the first filter 48 is the same as the thickness of the first retaining member 44.

In the present exemplary embodiment, the second filter 50 is also configured by a porous resin (sintered resin product), and more specifically, is made of polyether ether ketone. The resin second filter 50 is thus fitted inside and retained by friction in the hollow portion at the radial direction inside of the second retaining member 46 that is also made of resin. The thickness of the second filter 50 is the same as the thickness of the second retaining member 46.

A spacer 56 is disposed between the first retaining member 44 and the second retaining member 46. The spacer 56 is a hollow ring-shaped member that has a specific thickness T (described in detail later). The spacer 56 contacts both the first retaining member 44 and the second retaining member 46. In the present exemplary embodiment, the spacer 56 is made of resin.

An external diameter R3 of the spacer 56 is substantially the same as the external diameter R1 of the first retaining member 44 and the external diameter R1 of the second retaining member 46. However, an internal diameter R4 of the spacer 56 is smaller than the internal diameter R2 of the first retaining member 44. A radial direction inside portion of the spacer 56, more specifically a portion of the spacer 56 that is positioned further toward the radial direction inside than the internal diameter R2 of the first retaining member 44, is positioned further toward the inside than an inner ring edge (a radial direction inside edge of the ring shaped portion) of the first retaining member 44, and is in contact with a downstream end face of the first filter 48.

Figure 6:
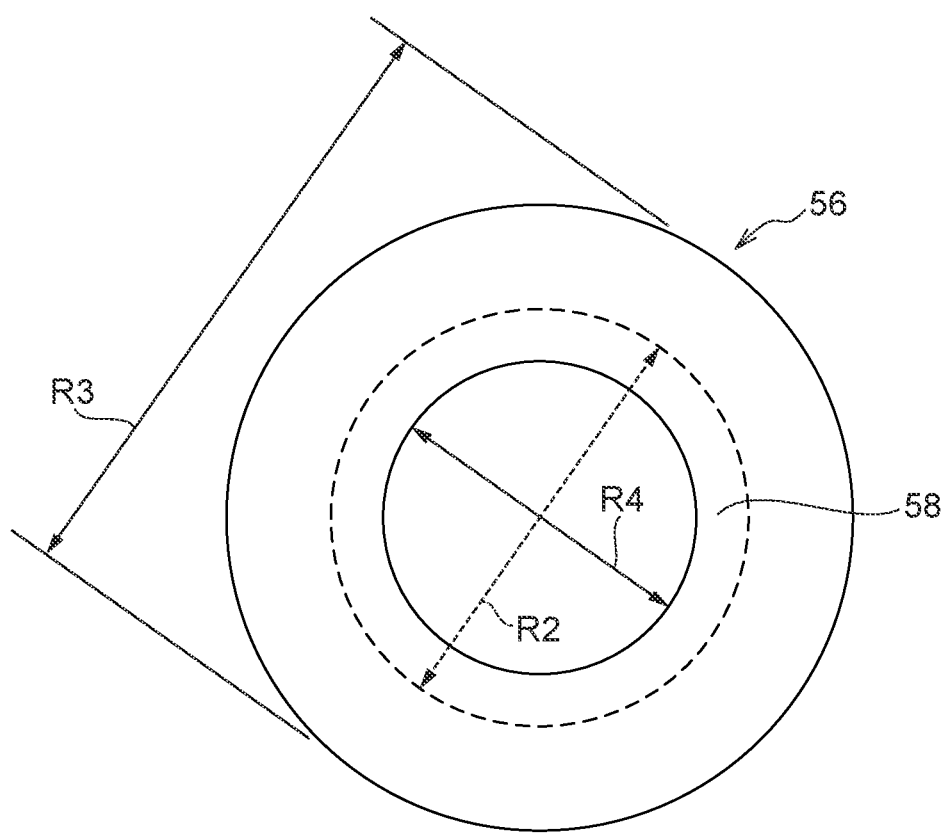
FIG. 6 is a front view illustrating a spacer of a filter device of the first exemplary embodiment.

As is also illustrated in FIG. 6, in the first exemplary embodiment, the spacer 56 includes a first contact portion 58 that contacts the first filter 48 around the entire inner circumference of the spacer 56. In other words, the internal diameter R4 of the spacer 56 is smaller than the internal diameter R2 of the first retaining member 44, and thus the first contact portion 58 is a ring shaped portion including the inner ring edge of the spacer 56 (radial direction inside edge of the ring shaped portion) and serves as an example of a contact tab. In the present exemplary embodiment, the first contact portion 58 also contacts an upstream end face of the second filter 50.

As illustrated in FIG. 3, the downstream filter structure 42 includes a ring shaped downstream retaining member 60, and a downstream filter 62 is retained clamped between the column body 38 and the downstream retaining member 60. Numerous percolation holes formed in the downstream filter 62 with a specific pore size have a pore size smaller than the particle size of the filler, such that the downstream filter 62 prevents the filler inside the column body 38 from being discharged to the exterior.

A third filter 66 is disposed further upstream than the upstream filter structure 40. The third filter 66 is a depth filter in which a fibrous material is interwoven so as to form a filter structure, and traps foreign material in the filtration subject not only at the filter surface but also in tortuous internal passages. This discourages clogging even if the filtration precision has dropped. The pore size (mesh size) of the third filter 66 is larger than the pore size of the first filter 48, and the thickness (liquid feed direction length) of the third filter 66 is thinner than that of the first filter 48 and the second filter 50. As an example, the first filter 48 and the second filter 50 each have a thickness of from 0.5 mm to 4 mm, and the third filter 66 has a thickness of from 0.05 mm to 0.3 mm. Since the third filter 66 is thinner than the first filter 48, spreading out that occurs as the eluent and sample flows through a space inside the third filter 66 can be kept to a minimum.

As illustrated in FIG. 4, the third filter 66 is attached to the first retaining member 44, and contacts the first filter 48 on the upstream side of the first filter 48. In other words, the first filter 48 configures a structure downstream of the third filter 66 that supports the third filter 66 by contacting the entire downstream face of the third filter 66. Namely, a filtration face of the third filter 66 is in contact with the first filter 48. In the present exemplary embodiment, the third filter 66 is a filter configured by a resin nonwoven fabric. Although it is difficult to fix the filter edge of a thin filter using a retaining member or the like without causing a reduction in the effective filtration surface area, in the present exemplary embodiment, the downstream face of the third filter 66 and the first filter 48 are in contact with one another, such that the third filter 66 is pressed against the first filter 48 by the flow of liquid, thus fixing the third filter 66. Since the third filter 66 is a depth filter with large pores, the likelihood of blocked pores arising in the first filter 48 at a contact location between the third filter 66 and the first filter 48 is low, and clogging therefore does not occur.

The caps 74, 76 are respectively mounted to the upstream side and downstream side of the column body 38 by being screwed into place. The upstream filter structure 40 is retained gripped between the column body 38 and the cap 74, and the downstream filter structure 42 is retained gripped between the column body 38 and the cap 76. The downstream face of the second filter 50 is in contact with the filler retained in the column body 38. Each of the caps 74, 76 is formed with a flow path 78 through which the sample flows.

The column body 38 and the respective filters are integrated together in order to form the analysis column 30. This enables effort required when replacing the column body 38 and the respective filters to be alleviated.

Explanation follows regarding operation of the present exemplary embodiment.

In the liquid chromatography device 12 illustrated in FIG. 1, the nozzle 22 is used to take a blood sample from the blood collection tube 16, and this blood sample is supplied to the dilution tank 28. A diluent solution is also supplied to the dilution tank 28 from a preparation liquid tank (not illustrated in the drawings) in order to prepare an introduction sample in the dilution tank 28.

The introduction sample prepared in the dilution tank 28 is supplied into and retained in the injection loop 64. The injection valve 36 is then switched so as to introduce the sample retained in the injection loop 64 into the analysis column 30. When the sample is introduced into the analysis column 30, components including sA1c, HbA0, and mutant Hb are adsorbed by the filler. The injection valve 36 is then switched as appropriate so as to sequentially supply the eluents A to E into the analysis column 30 according to a predetermined control sequence.

The eluent containing the various types of separated hemoglobin is then discharged from the analysis column 30. The eluent is supplied via a tube 86 to a light measuring cell of the light measuring unit 26, and is then guided via the tube 87 to the waste liquid tank 88.

In the light measuring unit 26, light from a light source is shone consecutively on the eluent. Transmitted light that has passed through the eluent is split using a beam splitter and picked up by light receiving elements. A chromatogram is computed and obtained by a control section of the light measuring unit 26 based on the light reception results of the light receiving elements.

The upstream filter structure 40 of the analysis column 30 of the present exemplary embodiment includes the third filter 66, the first filter 48, and the second filter 50 in sequence from the liquid feed direction upstream side. The filter pore size of these filters decreases on in sequence from the upstream side toward the downstream side. Accordingly, larger sized foreign material is removed in sequence from the upstream side.

The upstream side of the column body 38 is contacted by the second filter 50, thus suppressing the filler in the column body 38 from escaping (leaking) upstream.

The spacer 56 is disposed between the first retaining member 44 that retains the first filter 48 and the second retaining member 46 that retains the second filter 50. The spacer 56 creates a non-contact state between the first filter 48 and the second filter 50, such that a space is created between the first filter 48 and the second filter 50.

Figure 7:
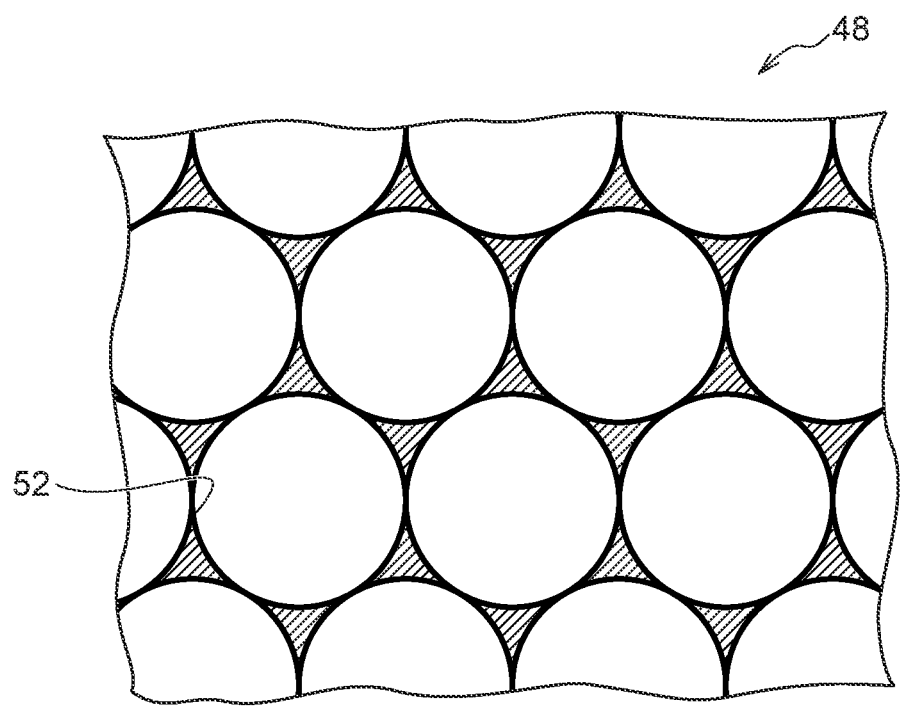
FIG. 7 is a front view illustrating part of a first filter of a filter structure of the first exemplary embodiment.
Figure 8:
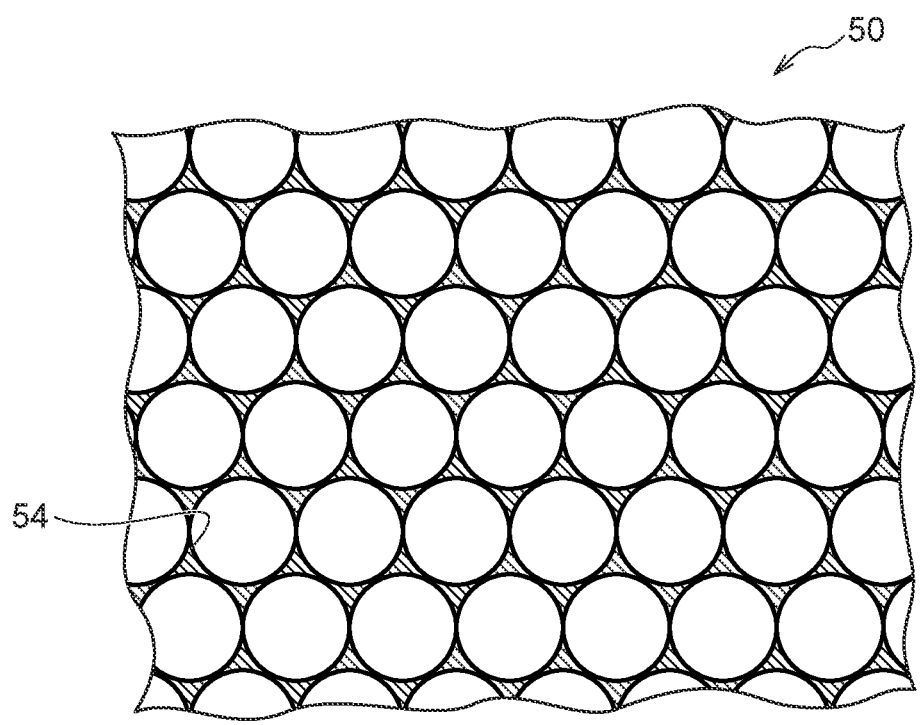
FIG. 8 is a front view illustrating part of a second filter of a filter structure of the first exemplary embodiment.

Note that FIG. 7 schematically illustrates the percolation holes 52 of the first filter 48. Similarly, FIG. 8 schematically illustrates the percolation holes 54 of the second filter 50. Note that although the shapes of the percolation holes 52, 54 are approximated to true circles in FIG. 7, FIG. 8, and FIG. 9, described later, in reality elliptical holes or polygonal holes may also be present.

Figure 9:
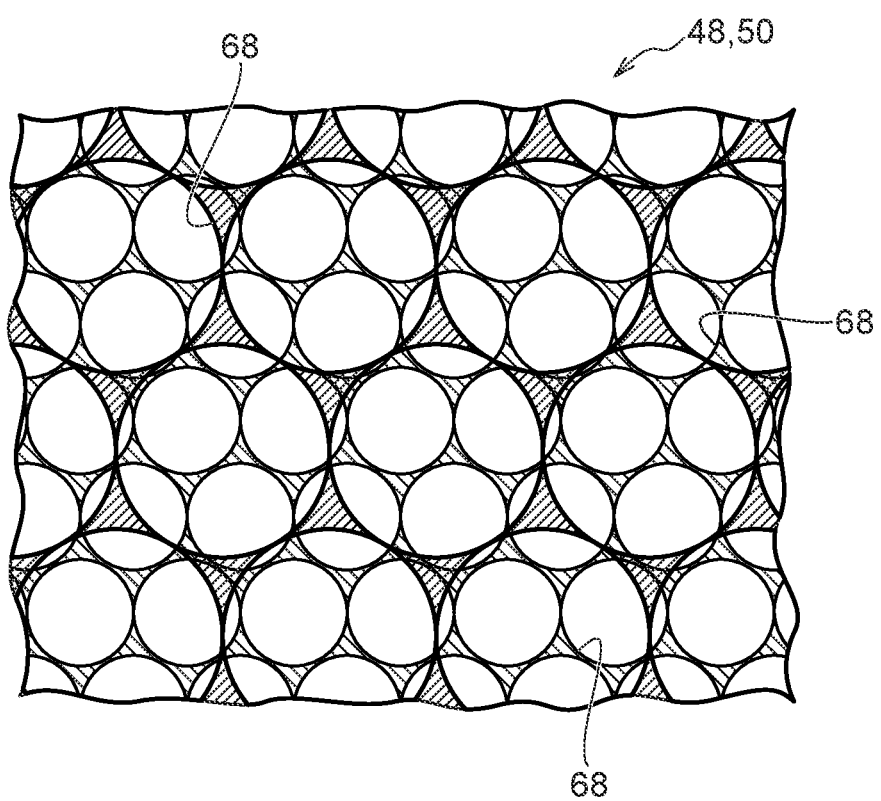
FIG. 9 is a front view illustrating part of a first filter and a second filter of a filter structure in an overlapping state.

At a boundary location between the first filter 48 and the second filter 50, the percolation holes 52 of the first filter 48 illustrated in FIG. 7 and the percolation holes 54 of the second filter 50 illustrated in FIG. 8 would overlap each other. As illustrated in FIG. 9, such overlapping of the percolation holes 52 and the percolation holes 54 would form fine holes 68 each having a smaller pore size than the pore size of the percolation holes 54. Since foreign material would pass through the fine holes 68 less readily than through the percolation holes 54 due to the smaller opening area, clogging would be liable to occur at the boundary location between the first filter 48 and the second filter 50. Such clogging would reduce the effective filtration surface area of the filters, which would for example lead to a drop in flow speed and an increase in the pressure of the sample being filtered.

To address this, in the present exemplary embodiment, the spacer 56 is used to create the non-contact state between the first filter 48 and the second filter 50. Since there is no boundary location between the first filter 48 and the second filter 50, locations (the fine holes 68 illustrated in FIG. 9) having a smaller opening area than the percolation holes 54 do not arise. Accordingly, the present exemplary embodiment is capable of suppressing clogging of the first filter 48 and the second filter 50. Suppressing such clogging enables a drop in the filtration performance of the filter device to be suppressed, and moreover enables increases in the lifespans of the first filter 48 and the second filter 50.

Moreover, in the upstream filter structure 40 of the present exemplary embodiment, the spacer 56 is provided with the first contact portion 58. The first contact portion 58 contacts the downstream face of the first filter 48. Accordingly, even if the first filter 48 is pushed toward the downstream side by the flow of the sample being filtered in the arrow F1 direction (see FIG. 4), the first filter 48 is suppressed from slipping or detaching from the first retaining member 44, enabling the spacing between the first filter 48 and the second filter 50 to be maintained. For example, the first filter 48 can be suppressed from moving downstream and contacting the second filter 50. Maintaining the spacing between the first filter 48 and the second filter 50 achieves such effects as suppressing a reduction in the filtration performance of the filter device, and increasing the lifespans of the first filter 48 and the second filter 50. Moreover, a second contact portion (not illustrated in the drawings) is provided on the opposite face to the first contact portion 58, and the second contact portion contacts the upstream face of the second filter 50. Although the second contact portion may be omitted since the spacer 56 is upstream of the second filter 50, such a second contact portion is capable of preventing the second filter 50 from slipping or detaching from the second retaining member 46.

As illustrated in FIG. 4, the upstream filter structure 40 of the present exemplary embodiment includes the third filter 66 that is provided further upstream than the first filter 48. The third filter 66 covers the first filter 48, and the pore size (mesh size) of the third filter 66 is larger than the pore size D of the percolation holes 52 of the first filter 48. This enables foreign material with a relatively large particle size to be removed from the sample being filtered first, by the third filter 66. Foreign material with a smaller particle size can then removed by the first filter 48, and foreign material with an even smaller particle size can then removed by the second filter 50.

The third filter 66 is further upstream than the first filter 48, and contacts the first filter 48. The first filter 48 therefore supports the third filter 66, enabling the third filter 66 to be suppressed from slipping toward the downstream side or deforming due to the flow of the sample being filtered in the arrow F1 direction. For example, since the third filter 66 is configured from nonwoven fabric, the third filter 66 flexes easily. However, since the third filter 66 contacts and is supported by the filtration face of the first filter 48, flexing of the third filter 66 is suppressed.

Note that the thickness T of the spacer 56 is not limited, as long as the thickness T is sufficient to place the first filter 48 and the second filter 50 in the non-contact state as described above. However, a lower limit for the thickness T of the spacer 56 is preferably set with respect to the pore size D (mm) of the percolation holes 52 of the first filter 48 so as to satisfy the relationship $D \times 10 \leq T$. So doing achieves a sufficient spacing between the first filter 48 and the second filter 50. The resulting gap enables, for example, a space in which the filtration subject that has passed through the first filter 48 can flow to be secured. This configuration is preferable since any obstruction to the flow of eluent can be suppressed even if foreign material contained in the filtration subject is trapped at the surface of the second filter 50.

Moreover, an upper limit of the thickness T of the spacer 56 is preferably set so as to satisfy the relationship $T \leq 0.2$ mm. With increasing flow path length to the column body 38, the sample spreads out more before reaching the column body 38, resulting in decreased separation precision. However, setting the thickness T of the spacer 56 within the above range enables good separation precision to be maintained. Moreover, in the present exemplary embodiment, since the upstream filter structure 40 is employed to remove foreign material from the sample flowing into the column body 38. an increase in pressure in the column body 38 can be prevented, enabling a decrease in separation precision to be suppressed.

The foregoing explanation describes the first contact portion 58, formed in a ring shape at a radial direction inside portion of the spacer 56 by setting the internal diameter R4 of the spacer 56 smaller than the internal diameter R2 of the first retaining member 44, as an example of the first contact portion provided to the spacer 56. However, since it is sufficient that the first contact portion 58 contact the first filter 48, the first contact portion 58 is not limited to the shape and placement described above. For example, the first contact portion 58 may be configured by protruding tabs as illustrated in FIG. 10 to FIG. 12.

Figure 10:
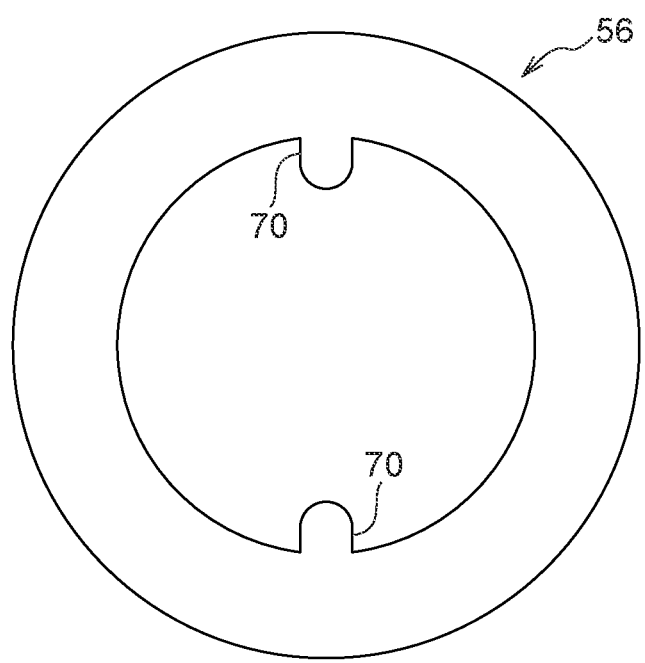
FIG. 10 is a front view illustrating a first modified example of a spacer of a filter device of the first exemplary embodiment.

In a first modified example illustrated in FIG. 10, protruding tabs 70 are formed protruding from the inner circumference of the spacer 56 toward the radial direction inside at two opposing locations. In the first modified example, the internal diameter R4 of the spacer 56 is equal to the internal diameter R2 of the first retaining member 44. Accordingly, the first contact portion can be formed with a simple structure by the protruding tabs 70 protruding from the inner circumference of the spacer 56 in this manner.

Figure 11:
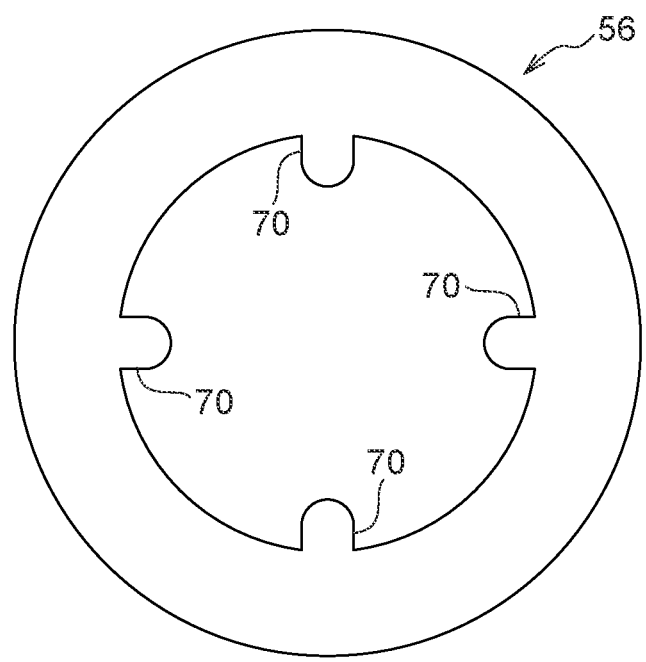
FIG. 11 is a front view illustrating a second modified example of a spacer of a filter device of the first exemplary embodiment.

In a second modified example illustrated in FIG. 11, the protruding tabs 70 of the first modified example illustrated in FIG. 10 protrude from the inner circumference of the spacer 56 toward the radial direction inside at four locations. In the second modified example illustrated in FIG. 11, since the number of the protruding tabs 70 is greater, the effect of suppressing slipping and detachment of the first filter 48 is greater than that of the first modified example illustrated in FIG. 10. On the other hand, in the first modified example illustrated in FIG. 10, since the number of the protruding tabs 70 is fewer than in the second modified example illustrated in FIG. 11, a smaller overall area of the percolation holes of the first filter 48 is blocked by the protruding tabs 70, thus enabling a greater flow path area to be secured in practice. Even the second modified example illustrated in FIG. 11 in which four of the protruding tabs 70 are formed is capable of securing a greater flow path area than the first contact portion 58 having the shape illustrated in FIG. 6.

Figure 12:
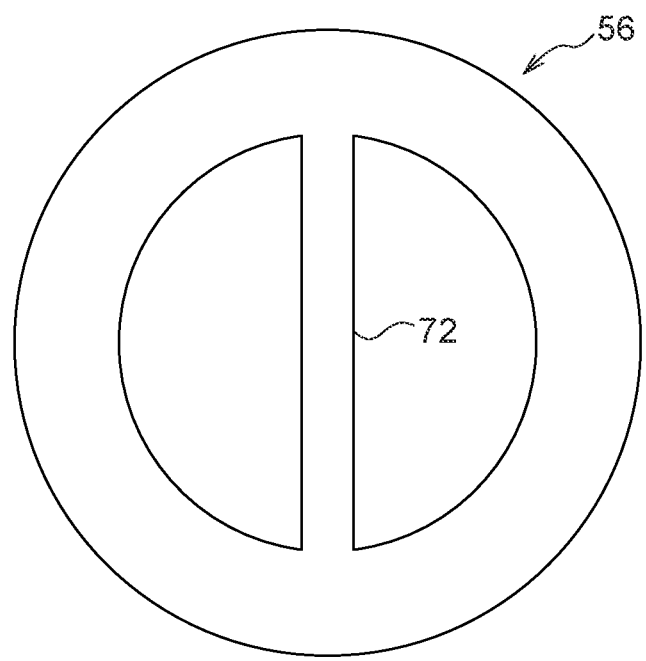
FIG. 12 is a front view illustrating a third modified example of a spacer of a filter device of the first exemplary embodiment.

In a third modified example illustrated in FIG. 12, a bridging tab 72 is provided spanning across the diameter of the inner circumference of the spacer 56. In other words, the bridging tab 72 has a shape achieved by extending the two protruding tabs 70 of the first modified example illustrated in FIG. 10 in their protruding directions until they join up. The flow speed of the filtration subject flowing through the radial direction inside of the first retaining member 44 is faster the closer it is to a radial direction central portion thereof. The bridging tab 72 of the third modified example illustrated in FIG. 12 also contacts the first filter 48 at this central portion, and is thus highly effective in suppressing slipping and detachment of the first filter 48.

By contrast, in the first contact portion 58 in the example illustrated in FIG. 6, the first contact portion 58 contacts the first filter 48 around its entire circumference, and is thus capable of suppressing slipping and detachment of the first filter 48 around its entire circumference. Since the first contact portion 58 can be formed simply by reducing the internal diameter R4 of the spacer 56, there is no need to form the protruding tabs 70 or the bridging tab 72 and the shape remains simple. Note that the modified examples of the first contact portion may similarly be adopted for the second contact portion. The first contact portion and the second contact portion do not have to have the same shape as each other. For example, the first contact portion 58 may have the shape described in the exemplary embodiment illustrated in FIG. 6, whereas the second contact portion may have the shape of the first modified example illustrated in FIG. 10.

The materials employed for the first retaining member 44, the second retaining member 46, the first filter 48, and the second filter 50 are not limited to the resins described above, and for example some or all of these components may be configured from metal. When fitting the resin first filter 48 into the resin first retaining member 44, the press fitting may incur some slight deformation (tightening) in order to achieve retention. In such cases, the first retaining member 44 and the first filter 48 responds to the deformation of the other thereof, enabling a seal to be formed at a tight fitting portion between the first retaining member 44 and the first filter 48. Due to being made of resin, the second retaining member 46 and the second filter 50 have a similar relationship, such that the second retaining member 46 and the second filter 50 responds to the deformation of the other thereof, enabling a seal to be formed at a tight fitting portion between the two.

In the exemplary embodiment described above, the first retaining member 44 and the second retaining member 46 are both hollow ring-shaped members. Instead of a circular outer circumference and a circular inner circumference, these hollow members may each have an elliptical or polygonal outer circumference and inner circumference as viewed along the arrow F1 direction. Alternatively, these hollow members may each have a combination of a circular and a polygonal shape, such as a polygonal shaped outer side and a circular inner side. Namely, as long as they have a structure with a closed curved shape as viewed along the arrow F1 direction, the first retaining member 44 and the second retaining member 46 are capable of respectively retaining the first filter 48 and the second filter 50 at the inside thereof.

The invention claimed is:

1. A column comprising:
    a filter device comprising:
        a first filter;
        a first retaining member that has a hollow shape, the first filter being fitted inside the first retaining member;
        a second filter that has a smaller pore size than the first filter;
        a second retaining member that is disposed downstream of the first filter and that has a hollow shape, the second filter being fitted inside the second retaining member; and
        a hollow ring-shaped member, an internal diameter of the hollow ring-shaped member being larger than the pore size of the first filter and the pore size of the second filter and being constant along a direction of a thickness of the hollow ring-shaped member, and the hollow ring-shaped member being disposed between the first retaining member and the second retaining member, maintaining a non-contact state between the first filter and the second filter, and including a first contact portion contacting the first filter; and
    a column body that is filled with a filler to separate a component contained in a sample that is filtered by the filter device,
    an upstream filter structure including the first filter, the first retaining member, the second filter, the second retaining member, and the hollow ring-shaped member; and
    a cap that is mounted to the column body so as to clamp the upstream filter structure between the cap and the column body.

2. The filter device of claim 1, wherein the first contact portion is provided in a ring shape by setting an internal diameter of the hollow ring-shaped member to be smaller than an internal diameter of the first retaining member.

3. The filter device of claim 1, wherein the first contact portion protrudes from a portion of an inner ring circumference of the hollow ring-shaped member toward a radial direction inside.

4. The filter device of claim 1, wherein a thickness T of the spacer is, with respect to a pore size D of the first filter, within a range satisfying a relationship $D \times 10 \leq T \leq 0.2$ mm.

5. The filter device of claim 1, wherein the first filter and the first retaining member are both made from resin.

6. The filter device of claim 1, further comprising a third filter that is disposed upstream of the first retaining member and that has a larger pore size than the pore size of the first filter.

7. The filter device of claim 6, wherein the third filter is thinner than the first filter.

8. The filter device of claim 6, wherein the third filter is a depth filter.

9. The filter device of claim 6, wherein the third filter contacts a filtration face of the first filter.

* * * * *